United States Patent [19]

Martin, Jr. et al.

[11] Patent Number: 4,663,557
[45] Date of Patent: May 5, 1987

[54] OPTICAL COATINGS FOR HIGH TEMPERATURE APPLICATIONS

[75] Inventors: Robert L. Martin, Jr.; James D. Rancourt, both of Santa Rosa, Calif.

[73] Assignee: Optical Coating Laboratory, Inc., Santa Rosa, Calif.

[21] Appl. No.: 763,451

[22] Filed: Aug. 7, 1985

Related U.S. Application Data

[63] Continuation of Ser. No. 665,914, Oct. 29, 1984, abandoned, which is a continuation of Ser. No. 284,553, Jul. 20, 1981, abandoned.

[51] Int. Cl.$^4$ .......................... H01J 5/16; H01J 61/40; H01K 1/26; H01K 1/30
[52] U.S. Cl. .................................... 313/112; 350/1.6; 362/293; 313/580
[58] Field of Search ............... 313/112, 113, 110, 580; 350/1.6, 1.7; 252/587; 362/293

[56] References Cited

U.S. PATENT DOCUMENTS

| | | | |
|---|---|---|---|
| 3,660,137 | 5/1972 | Furuuchi et al. | 350/1.7 |
| 3,848,152 | 11/1974 | Schultz | 313/112 |
| 4,017,758 | 4/1977 | Almer et al. | 313/113 |
| 4,229,066 | 10/1980 | Rancourt et al. | 350/1.6 |
| 4,524,410 | 6/1985 | Kawakatsu et al. | 362/293 |
| 4,535,269 | 8/1985 | Tschetter et al. | 313/112 |
| 4,588,923 | 5/1986 | Hoegler et al. | 313/112 |

Primary Examiner—Saxfield Chatmon
Attorney, Agent, or Firm—Flehr, Hohbach, Test, Albritton and Herbert

[57] ABSTRACT

A coated article useful in high temperature environments substantially in excess of 500° C. comprising a substantially transparent substrate formed of a material adapted to withstand said high temperature environment and an optical coating formed on one surface of said substrate and comprising a first set of layers consisting at least primarily of silicon dioxide and a second set of layers consisting at least primarily of tantalum pentoxide. The optical coating comprises an interference filter formed of alternating layers of fused silica and tantalum pentoxide. A halogen cycle lamp with visible light transmitting, IR reflecting filter formed on the outside surface of the lamp envelope improves energy efficiency by at least twenty-five percent.

12 Claims, 8 Drawing Figures

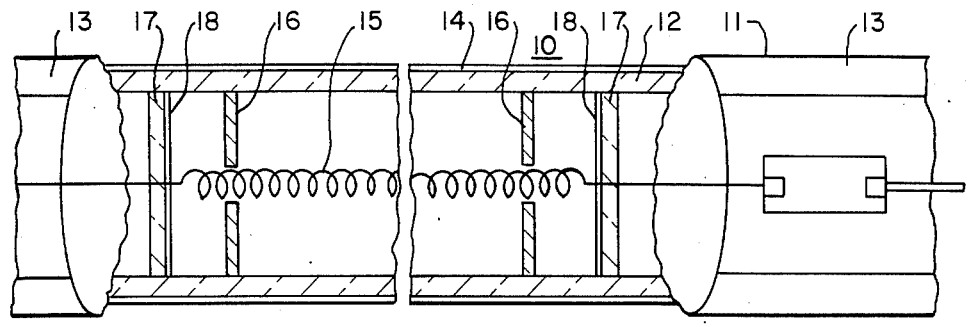
FIG.—1
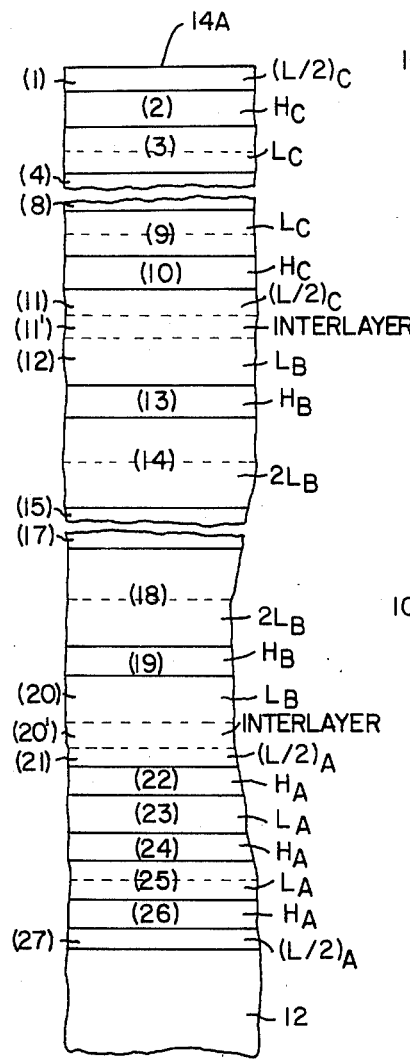
FIG.—2
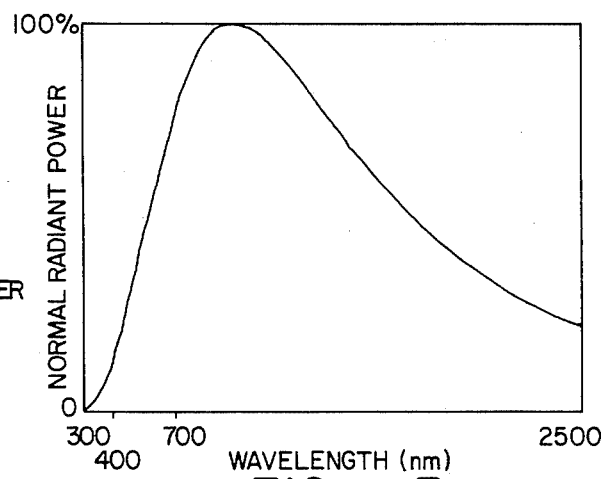
FIG.—3
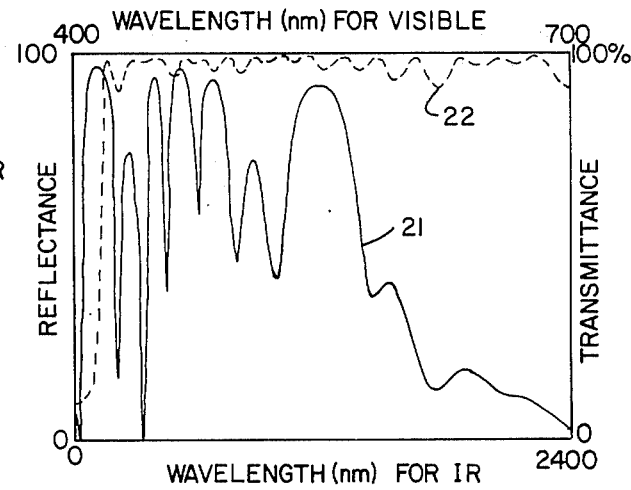
— IR REFLECTANCE
-- VISIBLE TRANSMITTANCE
FIG.—4

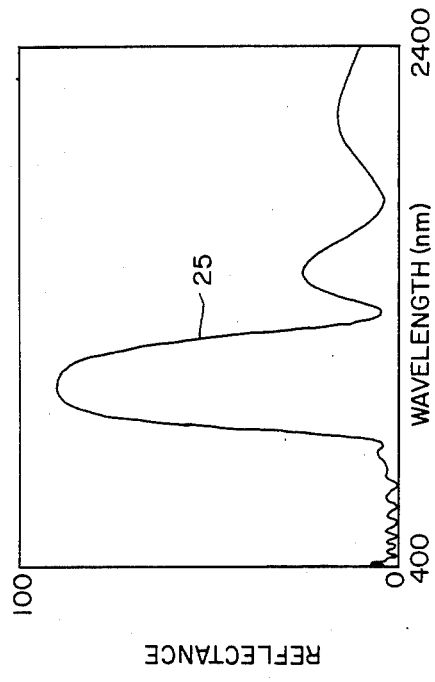
FIG.—5
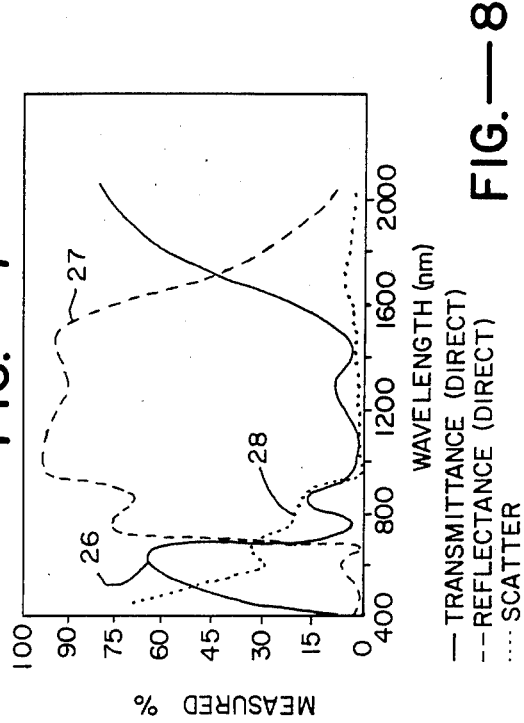
FIG.—6
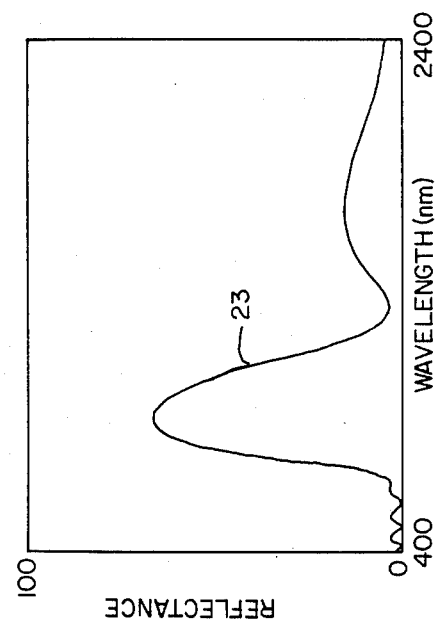
FIG.—7
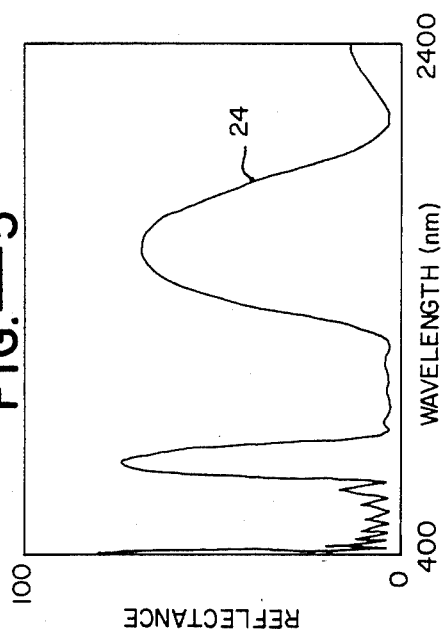
FIG.—8

OPTICAL COATINGS FOR HIGH TEMPERATURE APPLICATIONS

This is an continuation of application Ser. No. 665,914, filed Oct. 29, 1984 (now abandoned), which is a continuation of application Ser. No. 284,553, filed July 20, 1981, now abandoned.

This invention relates generally to optical coatings and specifically to optical coatings for high temperature applications. More specifically, this invention relates to high temperature, energy saving lamps with an optical coating thereon to improve energy efficiency.

Thin film optical coatings of the interference filter type which utilize two materials of different indices of refraction have not generally been applied in high temperature environments in which the coatings are exposed to the air at temperatures in excess of 500° C. for many hours. Typically thin film optical coatings do not survive these operating environments, failure being due to one of the following: loss of adhesion of the optical coating to the substrate, interdiffusion of the materials of the high and low refractive index layers of the coating, decrease in the index ratio of the two materials, evaporation of the thin film layers, or unacceptable increases in the absorption of the coating.

One application in which thin film optical coatings are useful is to improve the illumination efficiency of incandescent lamps. It is well-known that applying a hot mirror type of optical coating to the envelope of an incandescent lamp increases its energy efficiency. The hot mirror reflects infrared energy emitted by the filament back to the filament while transmitting the visible light portion of the electromagnetic spectrum emitted by the filament. This lowers the amount of electrical energy required to be supplied to the filament to maintain its operating temperature. For example, U.S. Pat. Nos. 3,949,259, 4,017,758, 4,127,789, 4,160,929, and 4,227,113 disclose the use of various types of hot mirrors on all or portions of an incandescent lamp envelope. However, none of these references discloses specific applications in which the optical coating is formed on a lamp envelope surface which operates in air at a temperature substantially in excess of 500° C.

U.S. Pat. No. 4,017,758 teaches the use of a hot mirror optical coating consisting of a composite of a heavily doped metal oxide filter formed nearest the filament body of the lamp and a multilayer interference filter disposed either adjacent to the heavily doped metal oxide filter or on a different surface of the lamp envelope. For example, the U.S. Pat. No. 4,017,758 suggests that both filters may be disposed on the inside wall of the lamp envelope or both on the outside wall or one component on the inside and the other on the outside wall surface, respectively. The U.S. Pat. No. 4,017,758 also discloses a special lamp embodiment utilizing a double wall lamp envelope and suggests various combinations which may be employed for disposing the interference filter and the doped metal oxide filter on lamp envelope walls in such an embodiment. Although the U.S. Pat. No. 4,017,758 makes specific reference to use of the composite filters disclosed therein in halogen lamps, the reference does not disclose any example of interference filter materials which could survive the operating temperatures of the surface of the lamp envelope of a halogen lamp. The only high refractive index materials referred to in the U.S. Pat. No. 4,017,758 are zinc selenide, zinc sulfide, and titanium dioxide. Thus, while the U.S. Pat. No. 4,017,758 refers to the use of silicon dioxide as the low refractive index layer in an interference coating (and it is well-known that silicon dioxide will survive in a high temperature environment) the high refractive index materials referred to in the U.S. Pat. No. 4,017,758 will not survive the high temperature environment of about 800° C. on the outside surface of the envelope of a halogen lamp.

Accordingly, it is the principal object of this invention to provide an optical coating comprising layers of low and high refractive index materials which will withstand a high temperature environment in excess of 500° C.

It is another object of this invention to provide a multilayer optical interference filter which is capable of withstanding a high temperature environment.

It is another object of this invention to provide a hot mirror optical coating which may be utilized in a high temperature environment.

It is a further object of this invention to provide a halogen cycle lamp envelope with an optical interference filter formed on the outer surface thereof which will survive the operating temperature of the lamp envelope.

It is a further object of this invention to provide a halogen lamp with an energy saving optical interference filter formed on an outer surface of the lamp envelope.

This invention is based on the discovery that an optical coating which comprises a first set of layers consisting at lest primarily of silicon dioxide and a second set of layers consisting at least primarily of tantalum pentoxide will survive a high temperature environment even where the optical coating is operated at the high temperature environment in air for a substantial period of time. Many other optical coating combinations with silicon dioxide as the low refractive index material and other refractory-type high refractive index materials such as titanium dioxide will not survive similar high temperature operating environments. It has also been discovered that optical coatings in accordance with this invention will survive the high temperature environment of the outside surface of a halogen lamp envelope having a small radius of curvature, since a small curvature accentuates problems of coating stresses due to thermal mismatches.

Accordingly, one aspect of this invention features a coated article useful in high temperature environments substantially in excess of 500° C. where the article comprises a substantially transparent substrate formed of a material adapted to withstand a high temperature environment and an optical coating formed on one surface of the substrate and comprising a first set of layers consisting at least primarily of silicon dioxide and a second set of layers consisting at least primarily of tantalum pentoxide. The optical coating may, for example, comprise an interference filter formed of alternating layers of these first and second sets thereof. The interference filter may comprise a bandpass filter designed to transmit radiation in a preselected first wavelength band and to reflect radiation in adjacent wavelength region. A specific example of such a bandpass filter is a hot mirror having high transmittance for visible light and high infrared reflectance. Alternatively, the bandpass filter may be a color filter having a high transmittance for a preselected portion of the visible light spectrum and high reflectance for adjacent spectral regions. The substrate on which the optical coating is formed may comprise a fused quartz lamp envelope adapted to be utilized in a halogen cycle incandescent lamp operating at an outer envelope surface temperature of at least about 800° C. with the interference filter formed on the outer surface of the lamp envelope.

In accordance with another aspect of this invention, a coated article is provided which is useful in high temperature environments substantially in excess of 500° C. and comprises a substantially transparent substrate formed of a material adapted to withstand the high temperature environment and an optical coating formed on one surface of the substrate and comprising a multilayer interference filter having high reflectance of infrared radiation and high scattering of visible light. This interference filter is formed by depositing on the substrate a multilayer dielectric stack composed of alternate layers consisting at least primarily of silicon dioxide and tantalum pentoxide and then baking the coated substrate in air at a temperature of at least about 1100° C.

In accordance with another aspect of this invention an improved energy efficient halogen lamp is provided. The halogen lamp comprises a lamp envelope having a geometry which has an internal focal point, line or plane and formed of a substantially transparent material capable of withstanding operating temperatures of at least 800° C. A high melting point metal filament is mounted within the lamp envelope substantially at the focal point, line or plane and a halogen gas is provided to fill the envelope. An interference filter is formed on an outer surface of the lamp envelope and is comprised of alternate layers consisting at least primarily of silicon dioxide and tantalum pentoxide, respectively.

The interference filter formed on the halogen lamp may be a bandpass filter having high transmittance for visible light and high reflectance of infrared radiation. Alternatively, the interference filter may comprise a bandpass filter having high transmittance radiation in a preselected portion of the visible light spectrum and high reflectance of radiation in adjacent wavelength regimes to produce a lamp which has a light output of a preselected color.

The interference filter formed on the halogen lamp may also comprise a visible light scattering, infrared reflecting filter formed by depositing on the outer surface of the lamp envelope a multilayer dielectric stack of the primarily silicon dioxide and tantalum pentoxide layers having a high transmittance of visible light and high infrared reflectance and then baking the envelope and filter in air at a temperature of at least about 1100° C. to convert the filter from a visible light transmitting filter to a substantially visible light scattering filter.

The halogen lamp in accordance with this invention may also utilize a multilayer interference filter formed on substrates utilized as end reflectors in the lamp envelope.

This invention enables for the first time improvements in energy efficiency to be applied in an optimal fashion to halogen cycle lamps by enabling the formation of an optical interference coating directly on the outside surface of the halogen lamp envelope which generally operates at a temperature of about 800° C. Improvements in performance in the range of about twenty-five to thirty percent have been measured in 1500 watt halogen cycle lamps to which the invention has been applied. This level of improvement would not be practicably achieved if the IR reflecting coating were placed on a separate surface surrounding and spaced from the outer surface of the lamp envelope to reduce the operating temperature of the coating.

The optical coatings of this invention may also find useful application in a wide variety of other high temperature environments such as heat reflecting windows for furnaces, laser pump lamps, and discharge lamps such as arc lamps utilized in theater projection equipment and the like. Generally the invention is applicable to providing optical coatings for use in any high temperature environment in which optical interference filter type of optical coating performance will provide an improvement in operating efficiency or other operating aspects of the apparatus on which the coating is employed.

Other objects, features, and advantages of this invention will be apparent from a consideration of the following detailed description taken in conjunction with the accompanying drawings.

FIG. 1 is a partly sectioned elevational view of a halogen lamp incorporating an optical coating in accordance with this invention.

FIG. 2 is a fragmented elevational view of a hot mirror coating design utilizing the principles of this invention.

FIG. 3 is a graph illustrating the spectral emission of a black body.

FIG. 4 is a graph showing the visible transmittance and infrared reflectance characteristics of an exemplary optical coating in accordance with this invention.

FIG. 5 is a graph of the spectral reflectance of a shortwave pass dielectric stack component of the overall optical coating illustrated in FIG. 2.

FIG. 6 is a graph of the spectral reflectance of a 2:1 dielectric stack employed as one component of the optical coating depicted in FIG. 2.

FIG. 7 is a graph of the spectral reflectance of another shortwave pass dielectric stack used as one component of the optical coating depicted in FIG. 2.

FIG. 8 is a graph of the spectral transmittance, reflectance, and scatter response of a visible light scattering, infrared reflecting optical coating in accordance with this invention.

Referring now to FIG. 1, the principles of this invention will be set forth in their application to a halogen cycle tungsten lamp 10. It should be understood, however, that the principles of the invention are applicable to any high temperature environment in which an optical coating may find utility. The halogen cycle lamp 10 comprises a lamp envelope 11 which includes a fused quartz tube 12 and a pair of end sealing and mounting structures 13. Along the central axis of the quartz tube 12 a coiled tungsten filament 15 is supported by a plurality of support structures 16. End reflectors 17 may be provided at the ends of the tungsten filament 15. In the manufacturing process, the halogen cycle lamp is formed by sealing the tube 12 using the sealing end sections 13 and then evacuating the tube 12 and refilling it with an appropriate reactive halogen atmosphere.

During operation of the halogen lamp 10, the halogen gas reacts with tungsten which has evaporated from the filament. The resulting gas is chemically decomposed at the hot surface of the tungsten filament so that the tungsten atoms therein are deposited on the filament and the halogen is freed to scavenge additional liberated tungsten atoms. In order for the halogen cycle lamp to operate properly, the quartz tube 12 must be maintained at a high temperature in the vicinity of about 800° C. and generally this is accomplished by keeping the diameter of the quartz tube 12 relatively small. For example, a typical lamp may be about ten inches long and about three-eights inch in diameter.

In accordance with this invention an optical coating 14 is deposited on the outer surface of the quartz tube 12. This optical coating comprises a first set of layers consisting at least primarily of silicon dioxide and a second set of layers consisting at least primarily of tantalum pentoxide. The design of optical coating 14 may take one of a number of forms depending on the spectral performance which is desired for the coating. Generally, the optical coating 14 will comprise one or more dielectric stacks in which alternating layers of silicon dioxide and tantalum pentoxide are formed to produce an interference filter.

For convenience the optical filter layers will be referred to as layers of silicon dioxide and tantalum pentoxide, but it should be understood that the silicon dioxide layers may not consist solely of silicon dioxide and the tantalum pentoxide layers may not consist solely of tantalum pentoxide. In each instance some amounts of other dielectric film constituents may be present. For example, the tantalum pentoxide may also contain a small percentage of another refractory oxide such as titanium dioxide. It should also be understood that the optical filter 14 may take one of several forms, each of which embodies the general principle that it is a selectively reflecting coating, i.e. it is substantially transparent to radiation in spectral regions in which it is desirable that the lamp 10 emit radiation and is substantially reflecting over the remainder of the spectrum of substantial emission of electromagnetic radiation by the hot filament. By reflecting back to the hot filament, radiation which is not desired to be emitted from the lamp conserves the energy otherwise required to maintain the filament at operating temperature and thus reduces overall energy requirements for operating the lamp.

One of the alternative forms which optical coating 14 may take is the coating design 14A depicted in FIG. 2 and having the design parameters set forth in Table 1 below. The overall performance of the coating is depicted in FIG. 4. As shown by the dashed curve 22, the coating 14A has high transmittance in the visible region of the electromagnetic radiation spectrum between 400 nanometers and 700 nanometers and has a high reflectance throughout the remainder of the spectrum, principally the near infrared where there is substantial emission of electromagnetic radiation by the hot filament of the lamp, as shown by the curve 21 in FIG. 4.

FIG. 3 illustrates the radiant power spectrum from a 3,000 Kelvin black body and shows that only a small percentage of the total radiation from the filament of a halogen cycle lamp is in the visible light region between 400 and 700 nanometers. The majority of the emitted radiation is in the infrared region above the visible light region of the spectrum. Unless the lamp is to be used for both heating and lighting, the emission of the infrared radiation from the lamp is wasteful of energy and in some applications produces an undesirable heating of the surrounding environment. For example, in theater and stage lighting where high intensity illumination is required, the heating effect from the high intensity lamps is unwelcome since it overheats the area which is being illuminated. By employing a visible light transmitting, infrared reflecting optical coating 14 on the lamp 10, the emitted radiation in the infrared region is reflected back to the filament 15 where it serves a useful purpose in keeping the filament heated and yet the major portion of the visible light emitted by the filament escapes the lamp and perform useful work in illuminating the surrounding environment.

TABLE 1

| LAYER | INDEX OF REFRACTION | PHYSICAL THICKNESS (nm) | QWOT* |
|---|---|---|---|
| Air | 1.000 | | |
| 1 | 1.458 | 94.28 | 550 |
| 2 | 2.130 | 129.11 | 1100 |
| 3 | 1.458 | 188.56 | 1100 |
| 4 | 2.130 | 129.11 | 1100 |
| 5 | 1.458 | 188.56 | 1100 |
| 6 | 2.130 | 129.11 | 1100 |
| 7 | 1.458 | 188.56 | 1100 |
| 8 | 2.130 | 129.11 | 1100 |
| 9 | 1.458 | 188.56 | 1100 |
| 10 | 2.130 | 129.11 | 1100 |
| 11 | 1.458 | 94.28 | 550 |
| 11' | 1.458 | 94.28 | 550 |
| 12 | 1.458 | 180.00 | 1050 |
| 13 | 2.130 | 123.24 | 1050 |
| 14 | 1.458 | 360.00 | 2100 |
| 15 | 2.130 | 123.24 | 1050 |
| 16 | 1.458 | 360.00 | 2100 |
| 17 | 2.130 | 123.24 | 1050 |
| 18 | 1.458 | 360.00 | 2100 |
| 19 | 2.130 | 123.24 | 1050 |
| 20 | 1.458 | 180.00 | 550 |
| 20' | 1.458 | 94.28 | 550 |
| 21 | 1.458 | 77.14 | 450 |
| 22 | 2.130 | 105.63 | 900 |
| 23 | 1.458 | 154.28 | 900 |
| 24 | 2.130 | 105.63 | 900 |
| 25 | 1.458 | 154.28 | 900 |
| 26 | 2.130 | 105.63 | 900 |
| 27 | 1.458 | 77.14 | 450 |
| Substrate | 1.460 | | |

*Quarter Wave Optical Thickness (i.e. reference wavelength at which layer has a quarter wave optical thickness)

Referring specifically to FIG. 2 and Table 1, it is seen that the performance of the overall filter depicted in FIG. 4 is attained in this instance by combining three types of dielectric stacks into an overall interference filter 14A. As shown in Table 1, the layers labeled 21–27 form a first dielectric stack I which has a dielectric stack design generally expressed as $(L/2\ H\ L/2)^3$ and comprises a shortwave pass interference filter at a design wavelength of 900 nanometers. The spectral reflectance of this shortwave pass stack is depicted in FIG. 5. This dielectric stack is considered a shortwave pass stack since it has very low reflectance at wavelengths less than the design wavelength of 900 nanometers and then a region of substantial reflectance at wavelengths greater than 900 nanometers. The second dielectric stack II is a 2:1 dielectric stack at a design wavelength of 1050 nanometers and having a stack design generally expressed as $(LHL)^4$. The spectral reflectance of this 2:1 stack is depicted as the curve 24 in FIG. 6.

The third dielectric stack III utilized in the coating 14A is a shortwave pass filter at a design wavelength of 1100 nanometers and having a design generally expressed as $(L/2\ H\ L/2)^5$. In each of the above design expressions for the various dielectric stacks I, II, and III, the "L" designates a layer of low refractive index material (i.e. silicon dioxide in this case) which has a quarterwave optical thickness at the design wavelength. Similarly, the designation "H" refers to a layer of higher refractive index material (i.e. tantalum pentoxide in this case) which has a quarterwave optical thickness at the design wavelength. Referring to the shortwave pass stack I for which the design specification is $(L/2\ H\ L/2)^3$, it is thus seen that each of the L/2 layers in the formula are layers which have an optical thickness equal to an eighth wave at the design wavelength. In the physical filter embodiment, the first and last layers in the stack I, i.e. layers 21 and 27 in Table 1 are actual eighth wave layers of the low index silicon dioxide material. On the other hand, layers 23 and 25 turn out to be quarterwave layers since they consist of two eighth wave layers formed at the same time. This same analysis holds for the shortwave pass stack III which utilizes five components of a (L/2 H L/2) design. The layers 1 and 11 are eighth wave layers, whereas the layers 3, 5, 7, and 9 turn out physically to be quarterwave layers, being the sum of two eighth wave layers. Furthermore, in actually building the filter, the layers 11, 11', and 12 become one physical layer and the layers 20, 20', and 21 become a single physical layer of the low index silicon dioxide material.

The designations for the respective layers on the righthand side of FIG. 2 should be interpreted as follows: the H and L designations again refer to a quarter-wave layer of low and high index material respectively and the subscripts A, B, and C refer to the three different design wavelengths where A signifies design wavelength of 900 nanometers, B designates a design wavelength of 1050 nanometers, and C designates a design wavelength of 1100 nanometers.

Other types of optical coatings may also be useful on the halogen cycle lamp 10 depicted in FIG. 1. For example, an optical coating 18 may be formed on the end reflectors 17 of the lamp. In this case, the optical coating 18 may be designed to reflect all components of the radiation emitted by the filament 15 since this will tend to maintain the energy emitted in the directions of the end reflectors within the cavity of the envelope 12 where it can do useful work in heating the filament and otherwise maintaining the internal temperature of the lamp.

Other designs for the optical filter 14 may also be desirable in certain applications. For example, in certain applications a colored light output is desired from the lamp. One way of achieving a colored light output is to filter the visible light emitted from the lamp through an absorbing-type color filter which transmits only the desired component of the visible light spectrum. However, such an absorbing filter wastes the energy emitted from the lamp and dissipates it in the filter itself. In accordance with this invention, the optical coating 14 may be designed to have a passband which encompasses only a selected portion of the visible spectrum such that only that portion of the radiation emitted by the lamp exits the lamp and all radiation at adjacent wavelengths including portions of the visible and the infrared are reflected back into the lamp and onto the filament to increase the energy efficiency of the overall lamp. The design of a narrow bandpass filter having high transmittance only in a portion of the visible light spectrum corresponding to the color desired to be emitted from the lamp is well within the skill of the art, for example, by following the general teachings in Chapter 7 of H. A. Macleod's, *Thin Film Optical Filters,* American Elsevier Publishing Company, New York (1969). Such filters could also be designed utilizing the concept set forth in Chapter 20 of MIL HBK. 144 published in October, 1962 by The Department of Defense. Chapter 20 is entitled "Application of Thin Film Coatings" and is authored by Philip Baumeister. Each of these reference works is incorporated by reference into this application as teaching all dielectric optical filter designs and design concepts which could employ the principles of this invention. In other words, it should be understood that this invention is generally applicable to all types of optical filters and in particular optical interference filters of the bandpass or edge filter type.

Generally the optical coating 14 shown in FIG. 1 would be formed on the lamp envelope 11 in a vacuum deposition chamber utilizing standard vacuum coating technology. For example, deposition of the optical coating on a small diameter lamp envelope may be accomplished in a standard planetary type deposition chamber by adding another degree of rotation which rotates each quartz lamp tube along its axis so that all portions of the outer surface thereof are uniformly exposed to the deposition source within the chamber. Generally, both the silicon dioxide and the tantalum pentoxide layers of the coating will be deposited in a reactive gas mode, onto a substrate which is maintained at a temperature of at least about 275° C. Either electron beam evaporation sources or resistance heated sources may be utilized. Reactive gas deposition involves bleeding oxygen into the chamber during the deposition process. To obtain a good yield of optical coatings on lamp envelopes having a small radius of curvature, it has been found preferable to arrange the deposition source with respect to the quartz tube substrate such that the average angle of arrival of the deposited material at the substrate will not exceed about thirty-five degrees.

Optical coatings employing the principles and materials of this invention have been built and tested at temperatures up to 1100° C. At temperatures below 1100° C., the optical performance of the filter remains substantially constant with no evidence of loss of adhesion of the coating, increase in absorption of the coating or interdiffusion of the layers of the coating. It has also been found that by baking the coating at 1100° C. in air for a number of hours, the coating can be transformed from a visible light transmitting, infrared reflecting filter to a substantially visible light scattering, infrared reflecting filter. The spectral performance of such a filter is depicted in FIG. 8. When the optical coating is exposed to this level of temperature in air for a significant period of time, the coating breaks up into many small islands which are very scattering for light in the visible portion of the spectrum but appear to radiation in the infrared region as a continuous reflecting film. The spectral performance depicted in FIG. 8 is for an optical coating of the design set forth in Table 1 above. Other coating designs could be fashioned which would optimize the scattering in the visible region and otherwise change the spectral transmittance, reflectance and scattering response of the filter.

Actual halogen cycle lamps employing the optical coating design depicted in FIG. 2 and set forth in Table 1 above have been fabricated and tested to demonstrate the improvement in energy efficiency of the lamp with the optical coating applied. 1500 watt lamps have been tested and have shown performance improvements in the range of twenty-five to thirty percent. These proven performance improvements correlate well with the theoretical percentage improvements values which have been calculated to be in the thirty to thirty-five percent region.

As previously indicated, the principles of this invention could be applied in other types of lamp environments such as arc discharge lamps in which an excited plasma emits light of various wavelengths. Due to the large number of free electrons in the plasma, plasma is a good absorber as well as a good emitter. Consequently, the concept of reflecting unwanted components of the light emitted from the plasma back into the plasma should also improve the energy efficiency of arc lamps. The principles of this invention may also be applied to laser pump lamps which utilize either a plurality of flash lamps or continuously operated incandescent lamps surrounding a ruby rod within a cavity. Since the ruby laser rod only absorbs light in certain portions of the spectrum, improvements in energy efficiency can be achieved by placing on the pumping lamps an optical coating which only transmits useful light to the laser rod. The unwanted light is reflected back into the pumping lamp to improve the lamp's efficiency.

While the principles of this invention have been discussed above in connection with several alternative embodiments, it should be understood that numerous other applications of the principles may be found by those of ordinary skill in this art. Accordingly, the invention is not limited to the specific exemplary applications described above but may be employed in any high temperature coating environment where optical coating may be employed to improve some aspect of the performance of the device to which the coating is applied.

What is claimed is:

1. An optical filter useful in an environment in which said optical filter is exposed to temperatures substantially in excess of 500 degrees Centigrade (such as the environment of a high temperature lamp), said optical filter comprising a substantially transparent substrate formed from a material adapted to withstand said temperatures and an optical coating formed on one surface of said substrate and consisting of a first set of thin film layers consisting primarily and essentially of silicon dioxide and a second set of thin film layers consisting primarily and essentially of tantalum pentoxide, said thin film layer of silicon dioxide and tantalum pentoxide alternating in said optical coating and forming an interference filter.

2. An optical filter as claimed in claim 1, wherein said substrate comprises a cylindrical tube of fused silica adapted to be formed into the envelope of a halogen cycle lamp and said optical coating is formed on the exterior surface of said tube, whereby said optical coating is subjected to a temperature of at least about 800 degrees Centigrade when said halogen cycle lamp is in operation.

3. An optical filter as claimed in claim 1, wherein said interference filter is a bandpass filter designed to transmit radiation in a preselected first wavelength band and to reflect radiation in an adjacent wavelength band.

4. An optical filter as claimed in claim 3, wherein said bandpass filter comprises a hot mirror having high transmittance for visible light and high reflectance for infrared radiation.

5. An optical filter as claimed in claim 3, wherein said bandpass filter comprises a cold mirror having high reflectance for visible light and high transmittance for infrared radiation.

6. An optical filter as claimed in claim 3, wherein said bandpass filter is a color filter having high transmittance for a preselected portion of the visible light spectrum and high reflectance for adjacent spectral regions.

7. A halogen cycle lamp comprising a lamp envelope having a geometry which has an internal focal point, line or plane and being formed from a substantially transparent material capable of withstanding operating temperatures of at least about 800 degrees Centigrade; a high melting point filament mounted within said lamp envelope substantially at said focal point, line or plane; a halogen gas filing said envelope; and an optical coating formed on an outer surface of said lamp envelope and consisting of a first set of thin film layers consisting primarily and essentially of silicon dioxide and a second set of thin film layers consisting primarily and essentially of tantalum pentoxide, said thin film layers of silicon dioxide and tantalum pentoxide alternating in said optical coating and forming an interference filter comprising a bandpass filter designed to transmit radiation in a preselected wavelength band and to reflect radiation in adjacent wavelength regions.

8. A lamp as claimed in claim 7, wherein said bandpass filter comprises a hot mirror having high transmittance for visible light and high reflectance of infrared radiation.

9. A lamp as claimed in claim 7, wherein said bandpass filter comprises a cold mirror having high reflectance for visible light and high transmittance of infrared radiation.

10. A lamp as claimed in claim 7, wherein said bandpass filter is a color filter having high transmittance for a preselected portion of the visible light spectrum and high reflectance for adjacent spectral regions.

11. An optical filter useful in an environment in which said optical filter is exposed to temperatures substantially in excess of 500 degrees Centigrade (such as the environment of a high temperature lamp), said optical filter comprising a substantially transparent substrate formed from a material adapted to withstand said temperatures and an optical coating formed on one surface of said substrate and consisting of a first set of thin film layers consisting primarily and essentially of silicon dioxide and a second set of thin film layers consisting primarily and essentially of tantalum pentoxide, said thin film layer of silicon dioxide and tantalum pentoxide alternating in said optical coating and forming an interference filter having high reflectance for infrared radiation and high transmittance for visible light; said coating being in the form of numerous small islands adhered to said substrate caused by an initial baking of said optical filter in air at a temperature of at-least about 1100 degrees Centigrade whereby said visible light is substantially scattered as it is transmitted through said optical coating.

12. An optical filter useful in an environment in which said optical filter is exposed to temperatures substantially in excess of 500 degrees Centigrade (such as the environment of a high temperature lamp), said optical filter comprising a substantially transparent substrate formed from fused silica adapted to withstand said temperatures and an optical coating formed on one surface of said fused silica substrate and consisting of a first set of thin film layers consisting primarily and essentially of silicon dioxide and a second set of thin film layers consisting primarily and essentially of tantatlum pentoxide, said thin film layer of silicon dioxide and tantalum pentoxide alternating in said optical coating and forming an interference filter, and said first layer of said coating formed on said fused silica substrate being a layer of silicon dioxide.

* * * * *